H. L. PITMAN.
COMBINED TYPEWRITING AND COMPUTING MACHINE.
APPLICATION FILED AUG. 14, 1917.
1,345,460.
Patented July 6, 1920.
9 SHEETS—SHEET 4.
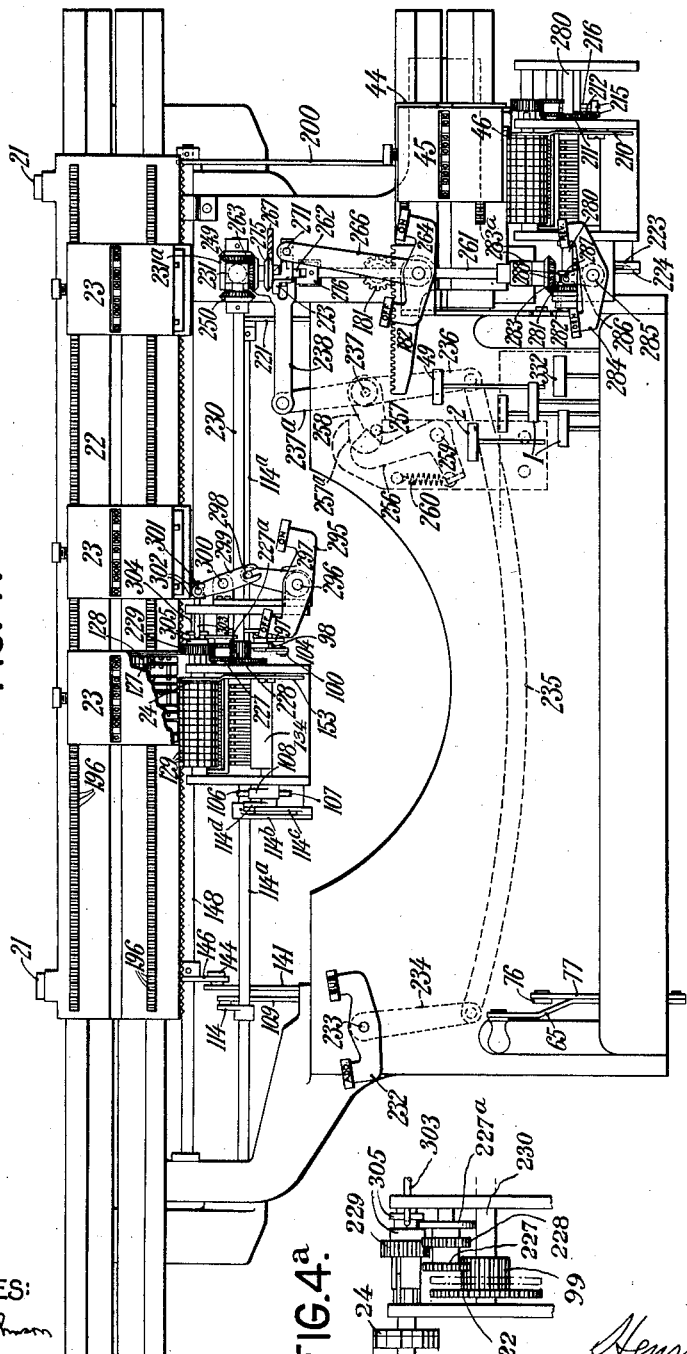
FIG. 4.
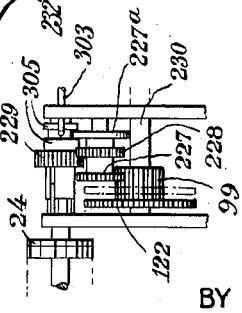
FIG. 4.ᵃ
WITNESSES:
INVENTOR:
Henry L. Pitman
BY
ATTORNEY.

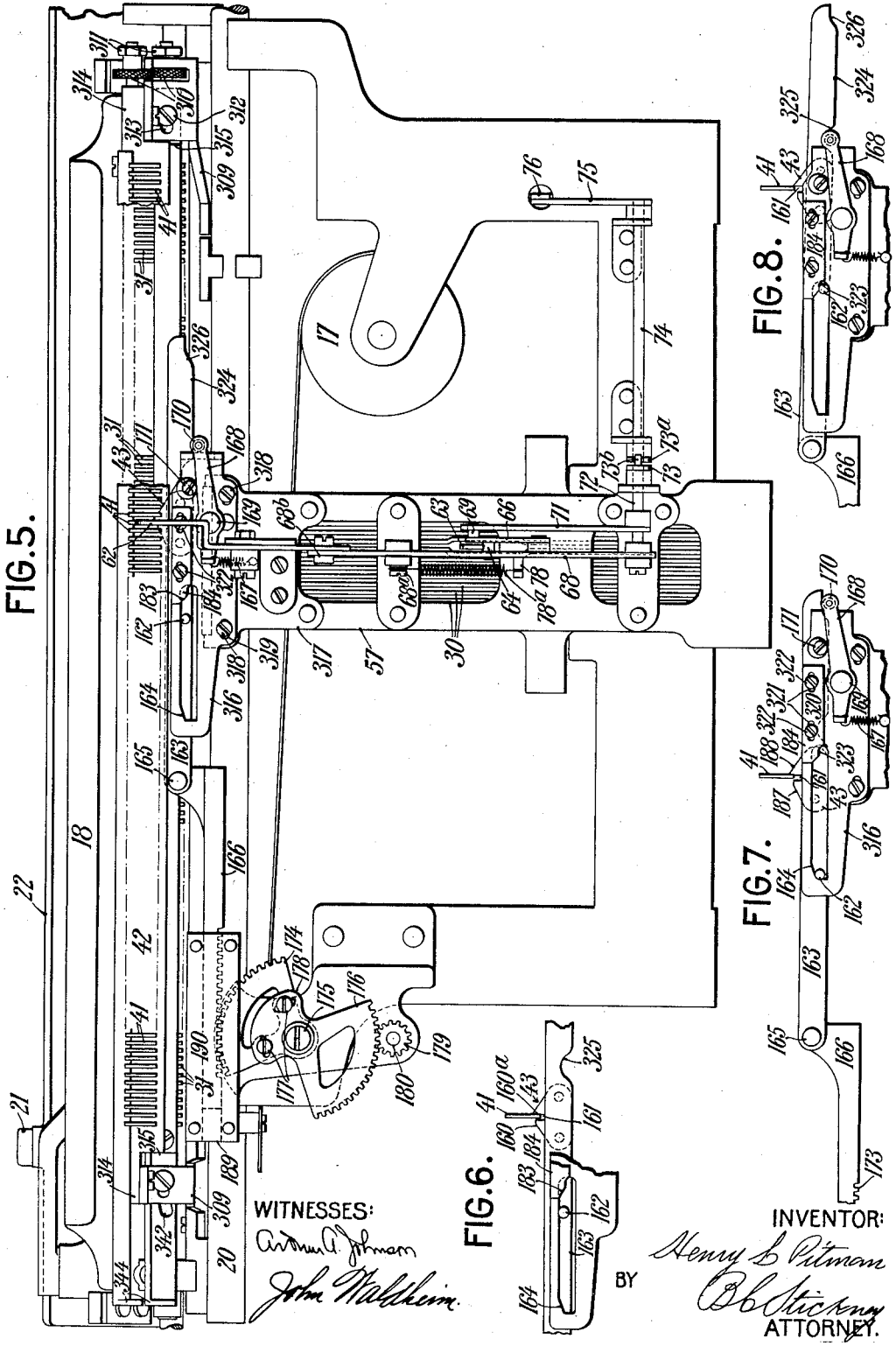

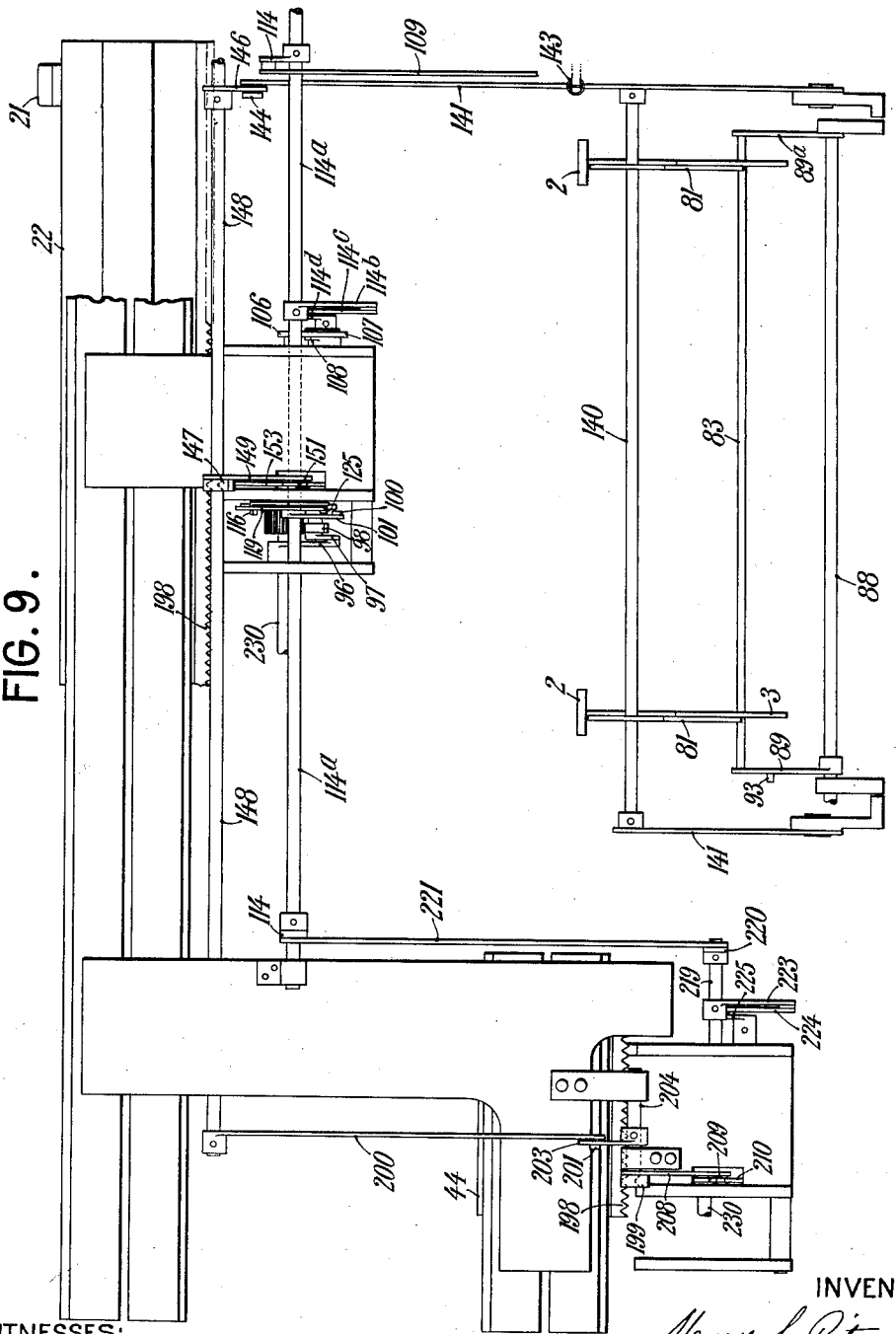

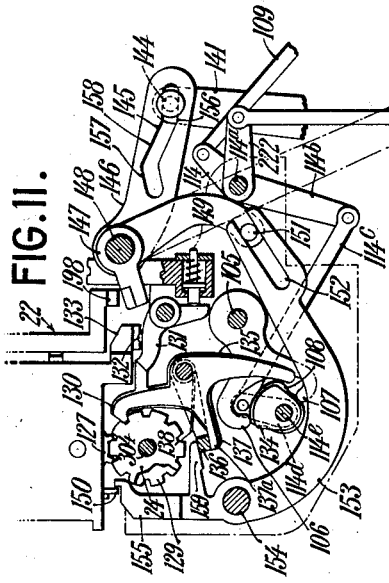

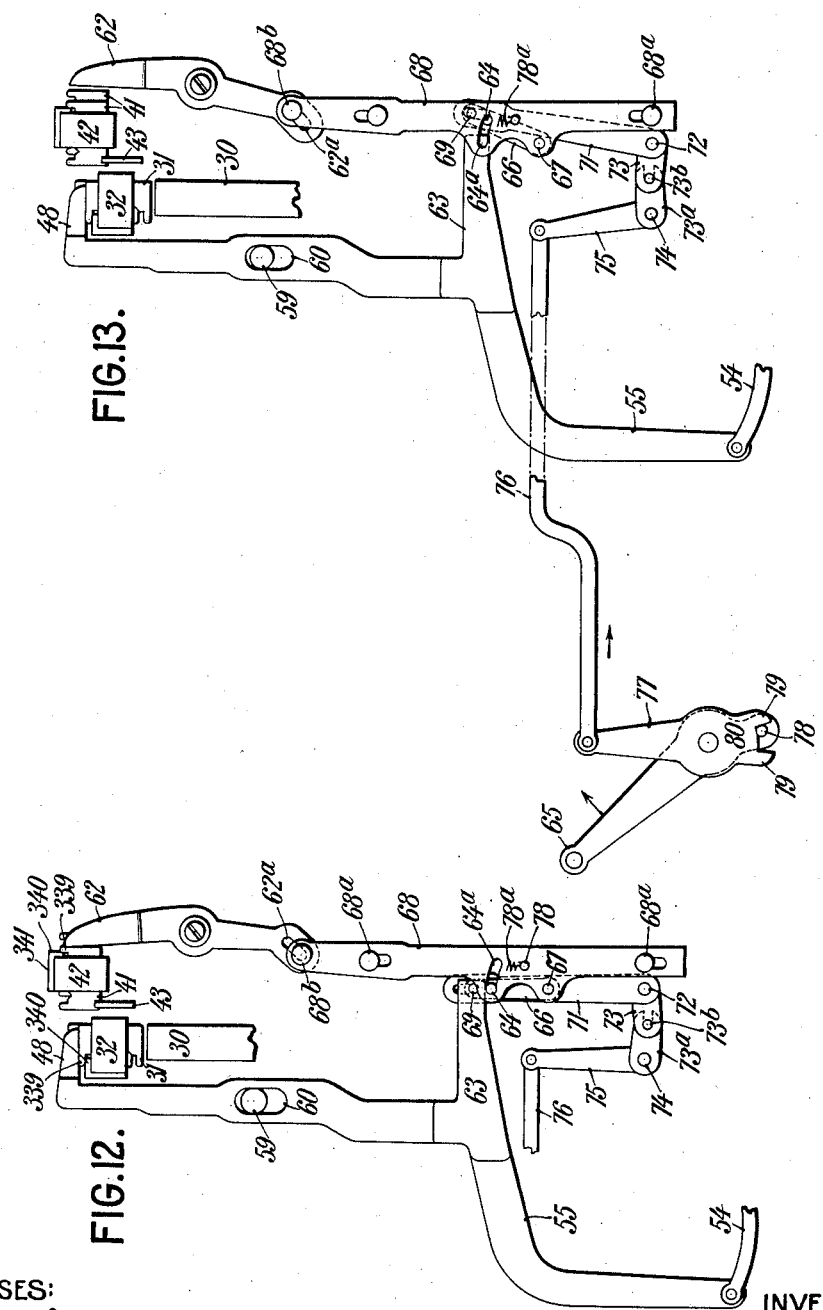

H. L. PITMAN.
COMBINED TYPEWRITING AND COMPUTING MACHINE.
APPLICATION FILED AUG. 14, 1917.
1,345,460.
Patented July 6, 1920.
9 SHEETS—SHEET 9.
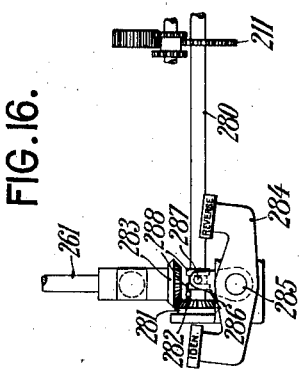
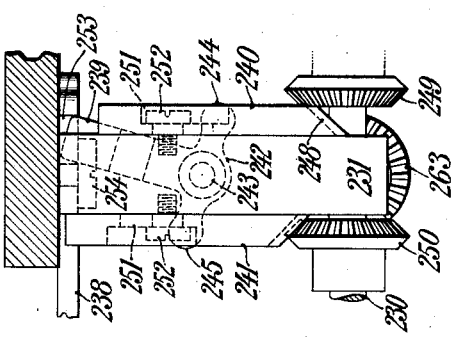
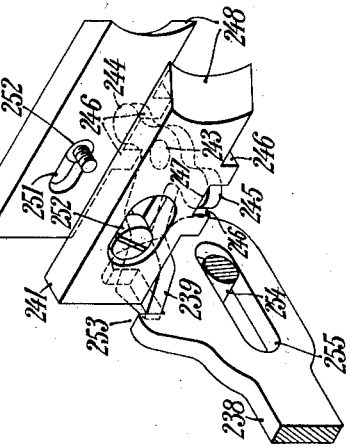
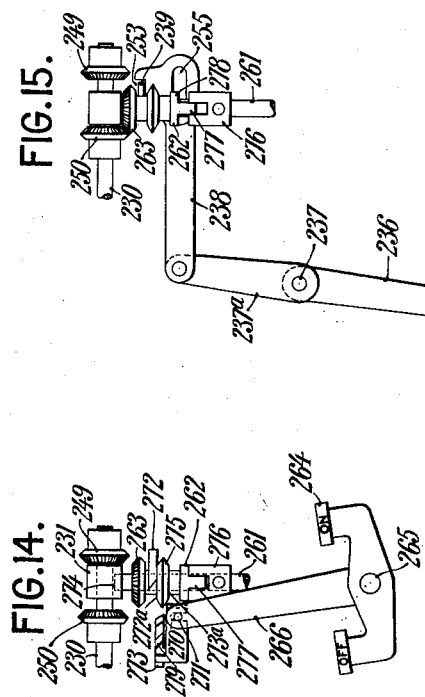
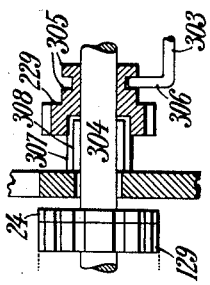
WITNESSES:
INVENTOR:
Henry L. Pitman
BY
ATTORNEY.

UNITED STATES PATENT OFFICE.

HENRY L. PITMAN, OF BROOKLYN, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,345,460. Specification of Letters Patent. Patented July 6, 1920.

Application filed August 14, 1917. Serial No. 186,098.

*To all whom it may concern:*

Be it known that I, HENRY L. PITMAN, a citizen of the United States, residing in Brooklyn borough, in the county of Kings, city and State of New York, have invented certain new and useful Improvements in Combined Typewriting and Computing Machines, of which the following is a specification.

This invention relates to computing machines, and is herein disclosed as applied to an Underwood addendagraph adapted to cross-add.

In such machines, it is desirable to reduce the complexity of structure to the greatest possible extent, and yet to utilize in a cross-adding machine, as far as possible, parts standard for a machine which is only a footing machine. It is also desirable to construct such a machine so that the setting up of the machine for any particular class of work and the general operation of the machine shall be as nearly analogous to typewriting as possible, for, in this way, the ordinary typewriter operators become easily accustomed to such machines with the consequent reduction of errors and increased rapidity of work.

In obtaining these results, it has been found possible to devise a machine which can use identical totalizers both for footing and for cross-adding, and to connect up the master wheels and the carry-over devices for the cross-adding and the footing totalizers in such a way that there is needed only a single conversion into circular motion of the variable throw received by the member operated by the numeral keys. Also, the carry-over devices and the locks, which hold the master wheels and the two carriages, may be connected by links, with the result that the mechanism is simplified from every point of view. It has been found possible to devise means for connecting the cross-adding carriage to the typewriter carriage in such a way that settable members analogous to ordinary tabulating stops may be used to connect the two carriages together, and it has also been found possible to provide that these connecting devices may be key-settable in a manner analogous to the key-set tabulator stop much used on typewriting machines.

In order to simplify the key-setting of the stops and the settable members, connections may be provided such that a single key may set either an ordinary tabulating stop alone, or else may set such stop concomitantly with the connecting devices. There may also be provided means adapted to return all the said settable members and said stops at will.

It has also been found possible to utilize substantially identical reversing devices for the two master wheels, and to provide keys or finger-pieces adapted to silence either master wheel at will.

Other features and advantages will hereinafter appear.

In the accompanying drawings,

Fig. 4 is a front view of the same.

Figure 1:
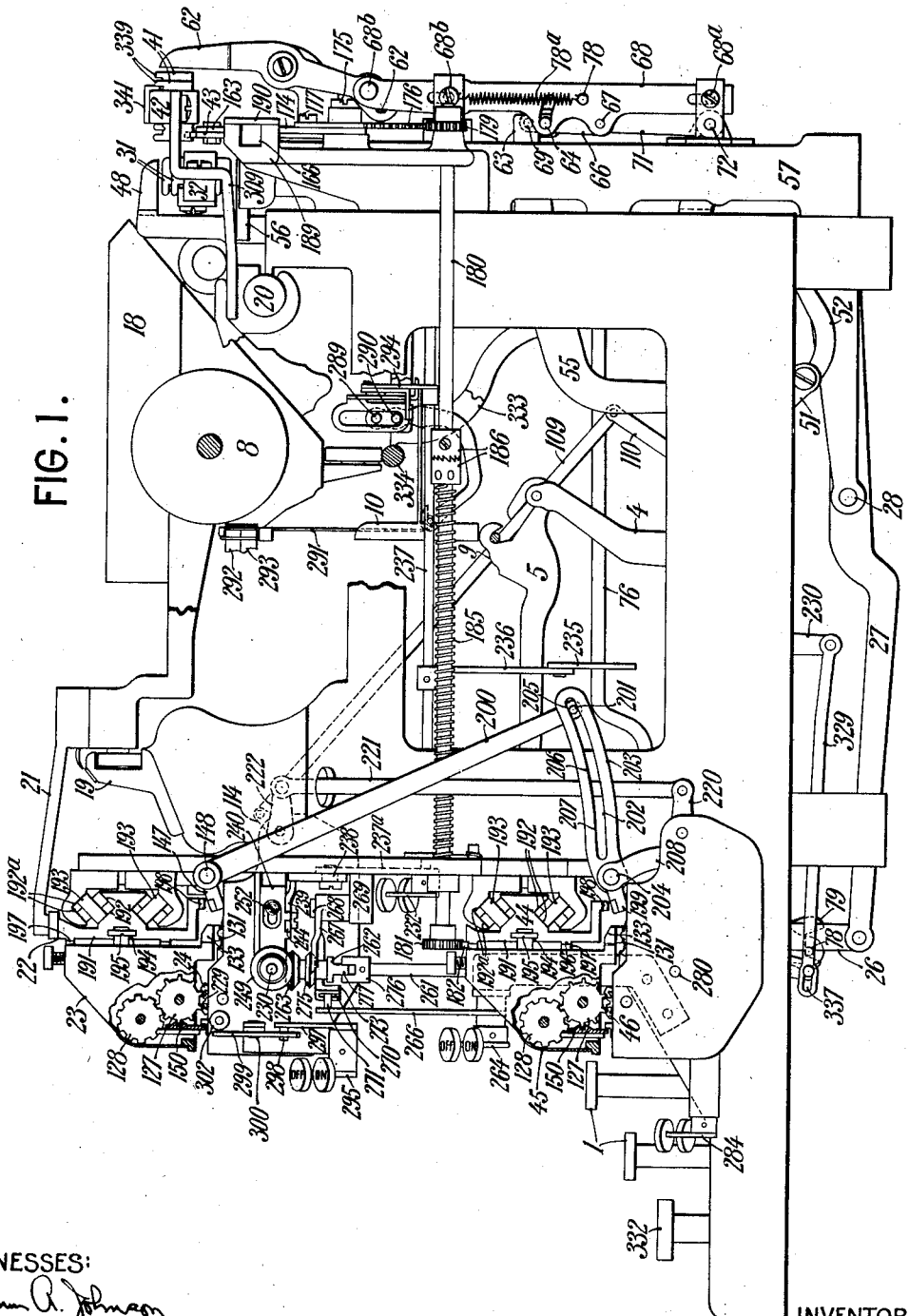
Figure 1 is a side view, largely diagrammatic, of a machine embodying this invention.

Fig. 4ª is a detail view of parts shown in Fig. 4, the driving means for the master-wheel to actuate the footing-totalizers being disconnected.

Fig. 5 is a rear view.

Figs. 6, 7 and 8 are details of parts shown in Fig. 5, the hook having picked up the cross-adding carriage in Fig. 6, being about to pick it up in Fig. 7, and in the act of releasing it in Fig. 8.

Fig. 9 is a rear view of some of the mechanism as seen from near the front.

Fig. 10 is a side view of the connections between the master-wheel locks.

Fig. 11 is a side view of the connections between two carry-over mechanisms.

Fig. 12 is a side view of part of the selective stop-setting mechanism, showing two kinds of settable members being simultaneously set.

Fig. 13 is a view of the same mechanism, showing a single stop being set.

Fig. 14 is a front view, showing the cross-adding drive shaft disconnected.

Fig. 15 is a similar view, showing it connected to subtract.

Fig. 16 is a front view of the cross-add-subtract mechanism, showing it at subtraction.

Fig. 17 is an enlarged perspective view of part of the mechanism for operating the add-subtract gear shift of Fig. 14.

Fig. 18 is a plan view of the same.

Fig. 19 is a plan view of the disconnect part of Fig. 14.

Fig. 20 is a detail of the main master-wheel disconnect device.

Alphabet keys 1 and numeral keys 2 are mounted on the front ends of key levers 3, so that depression of said key levers will swing the usual bell cranks 4, causing type-bars 5, having upper and lower-case types 6 and 7 thereon, to strike against the front side of a platen 8, as is usual in the Underwood typewriting machine.

Whenever any type-bar 5 approaches the platen 8, a heel 9 thereon strikes the front end 10 of a universal frame, causing said frame to move rearwardly and thereby vibrate the usual feeding dog 11 and holding dog 12, so that the dogs will alternately engage the escapement wheel 13, which is connected to the pinion 15 in mesh with the usual rack bar 16, thus permitting the typewriter carriage 18 to be drawn along in letter-feeding direction by means of the usual spring barrel 17, Fig. 5. The typewriter carriage 18, in which the platen 8 is revolubly mounted, travels on a front rail 19 and a rear rail 20.

As the typewriter carriage 18 travels along, it carries with it, by means of arms 21, the computing carriage 22, on which are mounted a number of totalizers 23, into which the digits written by the numeral keys 2 of the typewriter are adapted to be carried one at a time, by means of a master wheel 24, in a manner described below.

In order to rapidly position the typewriter carriage, there are provided decimal-tabulator keys 25 on the upper ends of plungers 26, said plungers being pivoted to the front ends of levers 27, which are pivoted near their middle on a rod 28, so that, when the front end is depressed, the rear end 29 rises and lifts its plunger 30 into the path of the column stops 31 which may happen to be set into effective position on the column stop bar 32, which is fast to the typewriter carriage.

When any tabulating key 25 is thus depressed, its plunger 30 lifts the rear end of a short universal bar 33, which overlies heels 34 on the plungers 30, so that the rising of any plunger will rock the universal bar 33 around its shaft 35, causing an arm 36 thereof to draw down on the usual link 37, with the result that said link lifts the front end of a lever 38 to which it is pivoted, causing the idle roll 39 on said lever to lift the rack bar 16 out of the pinion 15. This permits the typewriter carriage to travel along freely until it is arrested by the elevated plunger 30, which intercepts the set stop 31. Upon release of any key 25, it returns to normal position under the tension of its spring 40, which tends to draw down the plunger 30.

In addition to the stops 31, which are settable on the carriage, there are also a settable set of stops or blades 41 on a rack bar 42, said blades being adapted to be moved from their normal ineffective position into effective position, in which they are adapted to pick up and carry along a hook 43, which, in a manner hereinafter described, is connected to a second or cross-computing carriage 44 including a totalizer 45, said totalizer being adapted to be actuated by a cross-adding master wheel 46.

Figure 2:
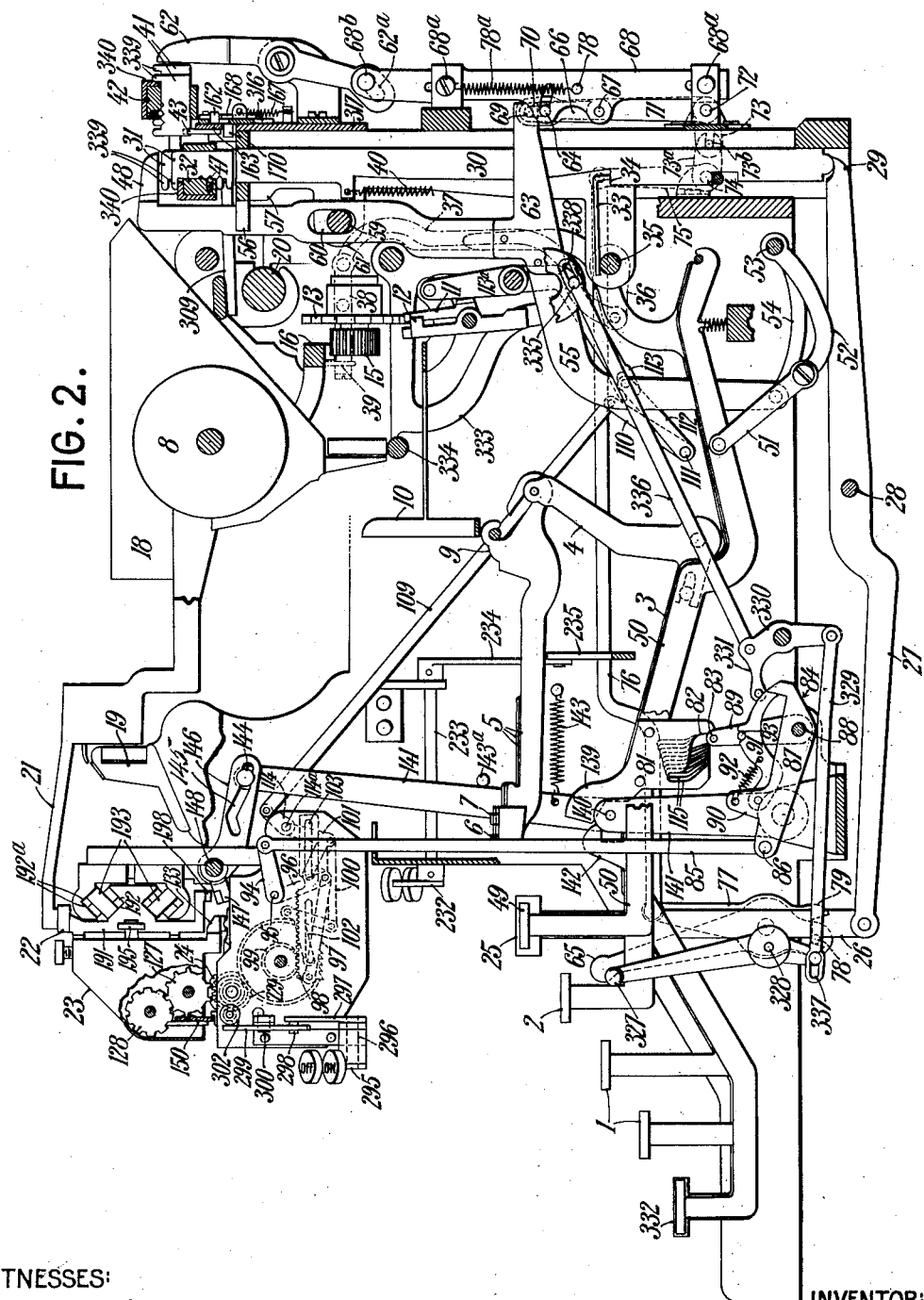
Fig. 2 is a view similar to Fig. 1, but largely in section.

There is a stop 31 for almost every letter-space in the travel of the typewriter carriage, and these stops are adapted to be normally held in an upper position (see Fig. 2), but are shiftable to a lower position, being held at either position by a spring ball detent 47. The blades 41 are of similar structure and mounting, except that in the present disclosure they are shown as moving horizontally.

Figure 3:
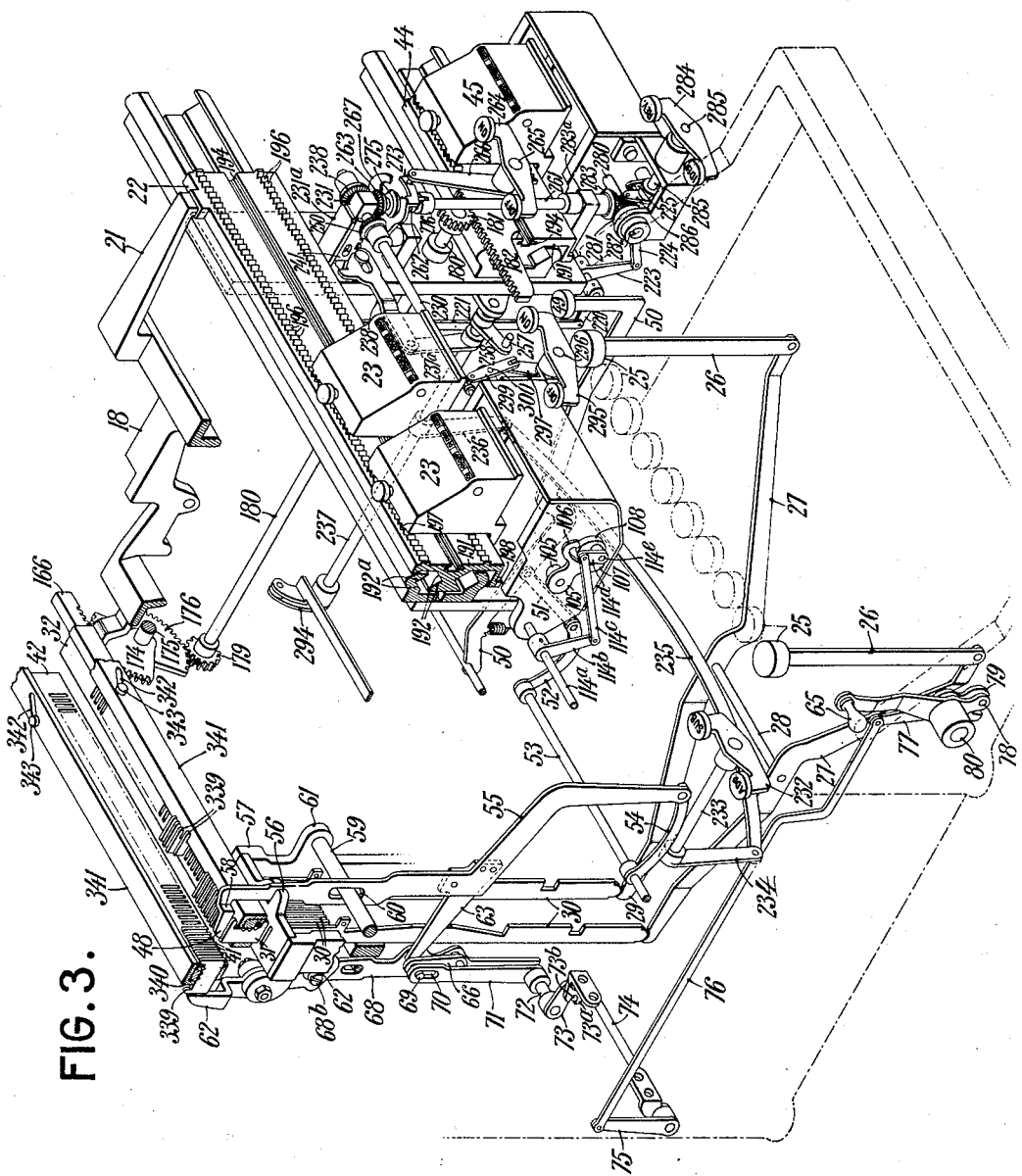
Fig. 3 is a perspective view from the opposite side.

For many purposes it is advantageous to have the stops 31 and the blades 41 easily settable simultaneously at will, and also to have the stops and blades easily settable from the front of the machine. Whenever it is desired to set, that is, to depress a stop 31, the typewriter carriage is positioned by hand, with the aid of the usual scale and pointer, at the letter-space on which said stop would bring it to rest, and then a key-operated stop-setting arm 48 is depressed by the stop-setting key 49, thus causing said arm to descend vertically and carry down the stop 31 which it is desired to set. The stop-setting key 49 is on the front end of a key lever 50 of the usual character, and is pivotally connected by a link 51 to a rock-arm 52 fast on a rock shaft 53, so that, whenever the key 49 is depressed, the rock shaft 53 will carry down a second rock-arm 54 fast thereon, thus carrying down a pendent extension 55 (Figs. 1, 3 and 12) of the stop-setting arm 48. The stop-setting arm 48 is guided near its upper end by lugs 56 projecting from the usual tabulator plunger casing 57, thus steadying said arm, so that it may be offset, as at 58, at the top, in order to enable the rest of the mechanism to be mounted at any advantageous point. The stop-setting arm 48 may also be guided by a rod 59, which passes through a slot 60 therein, and is fast on lugs 61 of the tabulator plunger casing.

The key 49 is not only adapted to set the settable members or stops 31, but is also adapted to set the settable members or blades 41. For this purpose, there is provided a blade-setting arm 62, which is adapted to be connected in such a way that the stop-setting key 49 may operate it or not, at will.

To enable this to be done, the stop-setting arm 48 (Figs. 12 and 13) is provided with an extension 63, which may or may not overlie a pin 64, which is adapted to operate the blade-setting arm or lever 62, i. e., this pin 64 may either underlie the extension 63, as seen in Fig. 12, or may be shifted rearwardly, as shown in Fig. 13, so that it stands clear of the extension 63.

To enable this to be conveniently done, there is provided, adjacent the left-hand side of the key-board, a handle 65 which controls the pin 64. To enable the handle to control the pin, the pin is mounted on a link 66 pivoted at 67 on a slide 68, said link being adapted to be moved rearwardly to carry the pin to ineffective position when the handle is drawn forwardly. To accomplish this, the link 66 carries a pin 69, which rides in a slot 70 in a rock-arm 71, and this rock-arm is operated by the handle 65 through the following connections. The rock-arm 71 is fast on a rock shaft 72 which carries a second rock-arm 73, said latter rock-arm engaging a rock-arm 73ª by means of a pin-and-slot connection 73ᵇ, so as to rock with the shaft 74 to which the arm 73ᵇ is fast. The other end of the shaft 74 has fast thereto a rock arm 75, which, in turn, is pivotally joined by a link 76 to a pivoted vertical arm 77, said last-mentioned arm being operated by the handle 65 through a pin 78. Thus, if the pin 69 is effective, depression of the key 49 will lower the slide 68, which is guided near its ends on fixed pins 68ª, against the tension of a spring 78ª which normally holds it up, and causes the setting of a blade 41 by the arm 62, connection being made from the slide 68 by a pin 68ᵇ thereon engaging in a cam slot 62ª on the blade-setting lever 62.

In order to provide lost-motion and give the handle 65 a throw which will feel proper to the operative, the pin 78 operates the arm 77 with considerable lost-motion, said arm 77, for this purpose, being provided with ears 79, which are suitably spaced apart, thus allowing the handle 65 considerable idle motion between them.

The handle 65 is pivotally mounted on a stub shaft 80 which is mounted in the machine frame. The handle 65 works somewhat stiffly on the shaft 80, so that it will remain set in whatever position it may be shifted to, and is stopped in both directions by the pin 64 engaging in a slot 64ª in the slide 68.

To enable computing to be done, the numeral keys of the typewriter are adapted to operate the master wheel 24, and, for this purpose, each numeral key is provided with a cam plate 81 fast to its key lever 3. The cams 82 in these cam plates vary in shape with the numeral keys, in such a way, that when any numeral key is depressed its cam 82 will strike and give a differential throw to a universal bail 83, which forms part of a differentially rocking frame 84, said frame being adapted to rotate the master wheel 24. The bail 83, it will be noted, is at the bottom of the machine, whereas the master wheel 24 is near the top of the machine, and the differential motion is carried from the bottom of the machine to the top by a link 85 which is connected to the frame 84, so that it is differentially vibrated thereby at each depression of a numeral key.

To effect this, the link is pivoted at 86 to an arm 87 forming part of the frame 84, said arm being journaled on an idle shaft 88, which also forms part of the frame 84. The shaft 88 also serves to support arms 89 and 89ª (Fig. 9) on which the bail 83 is fast at its opposite ends.

To enable the bail 83 to operate the arm 87, there is pivoted on an extension 90 of said arm a swinging stirrup 91, which is normally drawn by a spring 92 into engagement with a pin 93 on the arm 89, so that the rocking of the arm 89 will swing the stirrup 91 forwardly and backwardly, and thereby operate the arm 87 and with it the link 85. The connections between the link 85 and the master wheel 24 may be identical with those shown in my co-pending application, Serial No. 81,574, filed March 2, 1916, which application, in many respects, resembles the British Patent, No. 11,254, dated August 4, 1915. The connections include a rock-arm 94 to which the link 85 is pivoted, said rock-arm being fast to a rock shaft 95, which carries a second rock-arm 96, with the result that the vertical vibration of the link 85 rocks the rock-arm 96 forwardly and rearwardly, so that a link 97 pivotally connected thereto will vibrate backwardly and forwardly a rack bar 98, which is adapted to engage a pinion 99 suitably geared to the master wheel 24. The connections are such that the rack bar 98 normally engages the pinion 99, and that depression of any numeral key 2 will cause the rack bar 98 to move forwardly an amount depending on the numeral key depressed.

The rise of the numeral key, however, is ineffective to turn the pinion 99 in a reverse direction, because the operation of the universal frame 10 by the numeral keys carries the rack bar 98 clear of the pinion 99 at the bottom of the key-stroke, in a manner similar to that described in my co-pending application, Serial No. 81,574, referred to above. To effect this, the rack bar 98 reciprocates on a parallel motion device which includes a link 100, a swinging arm 101 and a bell-crank 102, said swinging arm and bell-crank carrying pins upon which the rack bar 98 rides by means of slots 103 therein, and this parallel motion device is operated by the universal member 10.

To effect such operation, the link 100 is pivotally attached to one arm 104 of the bell-crank 102 fast to a shaft 105, which shaft extends to the left through the casing of the master wheel mechanism (see Fig. 3), where it carries a pair of followers 106 and 107, which engage a cam 108, said cam being adapted to be operated by the escapement mechanism of the typewriter. To thus operate it, there is provided a link 109, which is pivotally attached to one end of a rock-arm 110 fast on a rock shaft 111, said shaft being adapted to be operated by the escapement mechanism of the typewriter. The connections between the shaft 111 and the escapement mechanism include a rock-arm 112 on the shaft 111, which, by a pin-and-slot connection, engages a tail 113 extending downwardly from the rock frame 113$^a$, on which the rear end of the universal member 10 is carried. The connections between the link 109 and the cam 108 include a rock-arm 114, which is fast on a rock shaft 114$^a$, said shaft also carrying a second rock arm 114$^b$, which is pivotally joined by a link 114$^c$ to a rock-arm 114$^d$ fast to the shaft 114$^e$ to which the cam 108 is also fast.

In order that the differential motion of the rack bar 98, produced by any numeral key, shall be completed and the rack bar be at rest when it is moved clear of the pinion 99, the cams 82 are provided with dwell portions 115 which are positively adapted to bring the rack bar to rest before the universal frame 10 becomes effective on the rack bar.

In order to prevent overthrow of the pinion 99 and therefore of the master wheel 24, and to positively lock said pinion and the master wheel during the idle stroke of the rack bar 98, there is provided a locking dog 116, which is pivoted on the shaft 105 (Fig. 10).

In order to obtain positive connection from the tooth or dog 116 to the link 109, there is provided a follower 118 at the rearward end of the extension 117 and said follower lies in the path of a cam 119, which is fast on the shaft 114$^a$, which is operated by the link 109, said cam 119 comprising a long dwell portion 120, which permits the tooth 116 to remain in idle position, and also comprising a steep portion 121 which strikes the follower 118 and thrusts the tooth 116 into a pinion 122 fast to the pinion 99, said pinion 122 having teeth each with one vertical face adapted to arrest the pinion against overthrow, and with one slanting cam face 123 adapted to coöperate with the tooth 116 to complete the throw of the pinion 99 in case the throw has been incomplete.

In order to make sure that the tooth 116 will not remain in engagement with the pinion or gear wheel 122, the cam 119 has a lower extension 124, which is adapted to strike against a follower 125 fast on an extension 126 of the locking dog 116 and forcibly cam the dog or tooth 116 clear of the wheel 122.

Each totalizer 23 and 45 includes computing wheels 127 and dial wheels 128, the latter being constantly in mesh with the former. The computing wheels are the wheels which are directly engaged by the master wheels 24 or 46, and the computing wheels are also engaged by the carry-over devices, which include carry-over wheels 129 and carry-over detents 130; the carry-over detents and carry-over wheels both being mounted on the frame of the machine, while the computing wheels 127 are mounted in the totalizer. The carry-over wheels 129 are normally held against turning by the detents 130, which are forced against said wheels by spring-pressed rock-arms 131, which arms, however, are set to ineffective position by the totalizer within the computing zone. To effect this setting, the rock-arms 131 are provided with projections 132, which are adapted to be struck and cammed down by a bar 133 fast on the totalizer, said bar extending substantially over the totalizer with the result that every carry-over wheel 129, which is in mesh with a computing wheel 127, has its detent freed from the bell crank 131; while the carry-over wheels, not in mesh with any computing wheel 127, remain held in place under the pressure of their detents which are made effective on them by the spring-pressed arms 131.

The details of this structure are more fully set forth in my co-pending application herein mentioned, and are found in machines of the addendagraph type now on the market.

In addition to moving the rack bar 98 into and out of mesh with its pinion 99, the shaft 114$^e$ also is adapted to complete the carry-over, and for this purpose is provided with a wiper cam 134, which, in the manner described in my aforesaid application, is adapted to successively strike the tails 135, which project downwardly from the detents 130, beginning with the right-hand one, with the result that the detents 130 are successively, forcibly thrust into engagement with the carry-over wheels 129, so that their points successively aline the carry-over wheels, and, therefore, take up any lost-motion that there may be between said wheels and the computing wheels. The master wheels 24 and 46 are each provided with a detent 130$^a$, similar to the carry-over detents 130, and actuated in a way similar to that of the carry-over detents. The carry-over mechanism also includes a universal bail 136 of the type hitherto used on certain addendagraph machines, and which overlies a second tail 137 on each detent 130 and a tail 137$^a$ on the master wheel detent, against which it is held by a spring 138, with the result that when any carry-over wheel turns and cams its detent 130 to ineffective position, the bail 136 is free of all the other detents 130, so that they may swing freely under any turning of their carry-over wheels.

Whenever any numeral key is depressed, it not only operates the mechanism so far described, but operates certain other mechanism connected with the computing, and advantageously does this through a different set of connections. For this purpose, each numeral key is provided with a cam 139 on an upward extension of its cam plate 81, so that all the cams 139 overlie a single universal bail 140, which swings on idle pivoted arms 141 and normally stands clear of hooks 142, of which there is one on each key. The depression of any numeral key causes the bail 140 to be swung forwardly against the tension of the spring 143, which normally holds it in ineffective position, against a stop pin 143ª, so that the bail catches under the hook 142 of every key, except the numeral key depressed at the moment, thus preventing the depression of a second numeral key, unless the first key has arisen again and permitted the bail 140 to swing again to ineffective position. In addition to locking the other keys, the swinging of the bail is adapted to lock the typewriter carriage against traveling. To accomplish this the left-hand arm 141 is extended upward and carries a follower 144, which rides in a cam slot 145 in a rock-arm 146 (Figs. 2 and 11), which controls a locking dog 147. The rock-arm 146 is connected to the locking dog 147 by the rock shaft 148, which extends across the machine, and also carries a rock-arm 149, which may be adjustably secured to the shaft 148 and which is adapted, among other things, to release a bail 150, which is pivoted within the totalizer and normally holds the wheels therein against turning. To accomplish this, the rock-arm 149 carries a follower 151 riding in a slot 152 of a lever 153, pivoted intermediate its ends at 154, so that the upper forward end 155 thereof will be swung forwardly at every depression of a numeral key, thereby swinging the bail 150 forwardly to its ineffective position. In order to effect the proper timing of the parts the slot 145, in which the follower 144 rides, comprises dwell portions 156 and 157 and also a comparatively steep portion 158. The connections are such that the bail 150 is absolutely clear of the wheels in the totalizer, during all the time that the master wheel is able to turn them. Not only does the lever 153 effect the locking and unlocking of the wheels in the totalizer, but it simultaneously effects control of the detents 130 and 130ª. To do this, the forward extension 155 of the lever 153 is provided with a rearwardly-extending tail 159, which normally lies directly upon the bail 136, thus holding said bail downward and therefore holding the detents 130 in engagement with their respective carry-over wheels, and the detent 130ª in engagement with the master wheel 24.

In order to effect cross-adding, the totalizer 45, as mentioned above, is adapted to be intermittently connected to travel with the typewriter carriage by means of the set blades 41. The connections for doing this are best shown in Figs. 1 and 5 to 8, inclusive. Whenever a set blade 41 strikes the hook 43, it just clears the cam 160 on the hook and catches the hook by a vertical projection 160ª, which rises just beyond a slot 161. The travel of the typewriter carriage then causes the blade 41 to carry along the hook 43, so that the pin 162 mounted on the bar 163, which carries the hook 43, will be carried forwardly clear of a short cam 164 (Fig. 7), thus permitting the hook to rise with the swinging of the bar 163 on its pivot 165, by which the hook is connected to the vibrating or reciprocating slide bar 166 (Fig. 6). To cause the hook to thus rise, there is provided on the frame a spring 167, which draws downwardly one end of a lever 168 pivoted at 169, so that the other end of the lever will rise and lift the bar 163 by means of a roller follower 170 journaled on the lever 168, the amount of this throw being limited by an adjustable eccentric stop 171, against which the lever 168 strikes as it rises. As the typewriter carriage carries the pin 162 clear of the cam 164, the slot 161 embraces the blade 41, thus causing the typewriter carriage to carry the hook with it, both forwardly and backwardly. The hook is formed as a plate riveted onto the bar 163.

As the hook 43 thus travels along with the typewriter carriage, the vibrating slide bar, which travels with it, causes the cross-computing carriage 44 to travel step by step with it. To effect this, there is formed on the slide bar 166 a rack 173, which meshes with a segmental gear 174, which turns on a stub shaft 175 at the rear of the machine. A second segment 176, journaled on the same stub shaft, is adjustably fastened to the segment 174 by screws 177, which pass through slots in an extension 178 of the segment 176 and enter the segment 174. The second segment 176 in turn meshes with a pinion 179 on the rear end of a shaft 180, said shaft extending to the front of the machine, where it carries a pinion 181, meshing with a rack 182 on the cross-computing carriage 44. Thus, the cross-computing carriage is positively geared to the typewriter carriage, so long as the hook 43 engages the blade 41.

When the typewriter carriage leaves the point at which a numeral is computed in the units wheel of the cross-totalizer 45, the typewriter carriage will release the hook 43 after the parts are properly adjusted. To effect this releasing, the pin 162 is adapted to engage a settable releasing cam 183 forming part of an adjustable cam plate 184, with the result that the feeding of the typewriter carriage, which results from depressing a numeral key in computing in said last wheel, will cause the hook 43 to be cammed downwardly into the position shown in Fig. 8, at which point it is in the act of being released from the set blade 41. The moment the hook 43 is thus released, the vibrating slide bar 166 is drawn back to its normal position by a spring 185 (Fig. 1), which is coiled around the shaft 180, so as to give an adjustable tension thereon by means of a pair of adjustable toothed collars 186. The spring 185 draws the slide bar back to the position seen in Fig. 7, at which point the pin 162 and cam 164 hold the hook 43. The hook 43 is provided with a second cam 187 to enable any other set blade 41 to pick it up in the meantime if it encounters a set blade before the pin 162 reaches its home position, the cam 187 enabling such set blade to momentarily cam the hook down and then seat itself in the slot 161.

To enable the typewriter carriage to be returned to the right, the left-hand face 188 of the hook, as viewed from the front of the machine, is formed as a cam to permit any set blades 41 to cam the hook downwardly out of the way as they move past it to the right. In order to hold the vibrating slide bar 166 steady, it works in a box-like frame 189, extending over a large portion of its length and provided with a cover 190. The return of the hook to normal position and the vibrating slide bar 166 with it, also entails the return of the cross-computing carriage 44 to a position for beginning a new computation.

The cross-computing carriage 44 is constructed on much the same lines as the main computing carriage, and each comprises a bar having a right-angle rearward extension 191, having two V-shaped faces 192, so as to engage upper and lower roller bearings, each comprising rollers 193, set at right angles to each other, said rollers traveling on opposing right angle faces 192$^a$ in the typewriter frame. Each carriage bar 191 also comprises a slot 194, having undercut faces adapted to be engaged by the manually releasable dog 195 on any totalizer. Each carriage bar 191 also includes a set of upper and lower pointed teeth 196, which are adapted to coöperate with similar teeth 197 or the dogs on the totalizers, thus enabling any of the totalizers to be accurately positioned on each carriage, the teeth 196 and 197, for this purpose, being spaced at letter space intervals. Each computing carriage also includes a rack 198 near the bottom thereof, adapted to be used for locking the carriage against travel while any computing wheel is being turned, the rack 198 on the main computing carriage being adapted to be engaged by the locking dog 147, mentioned above, while the rack 198 on the cross computing carriage is adapted to be engaged by a similar locking dog 199, which is connected to be operated in substantial unison with the dog 147. Back-pressure, which may tend to operate the carriage-locking dog 147 backwardly, is prevented from being transferred to the key lever by the dwell 157 acting on the pin 144.

The connections between these dogs include a swinging arm 200, which is fast on the rock shaft 148 carrying the dog 147, and the lower end of the arm 200 carries a follower 201 riding in a cam slot 202 in a rock-arm 203 fast to the shaft 204, which carries the dog 199. The cam slot 202 includes a dwell 205, in which the follower 201 normally rests, a driving cam part 206 and a dwell 207. In a similar way to that of the locking dog 147, back-pressure from the locking dog 199 is prevented from being transferred by the dwell 207 acting on the pin or follower 201. In addition to the dog 199, the shaft 204 carries a rock-arm 208, which may be adjustably secured thereto, said rock arm comprising a follower 209, which is adapted to operate a lever 210, which is substantially identical with the lever 153, and, like it, has an upper end 155 adapted to operate the locking bail 150 and also includes a tail 159 for controlling a bail 136, which overlies tails 137 and 137$^a$ on detents 130 and 130$^a$, respectively, all of which may be substantially identical with those described above for the totalizer 23 and master wheel 24. The detents 130 for the carry-over wheels 129 of the cross-totalizer 45 are also controlled by spring-pressed bell-cranks 131, like those for the totalizer 23, which are also adapted to be made ineffective by the bar 133 of the totalizer which is effective on the projections 132 of the bell-cranks 131. Associated with the cross-totalizer mechanism, there is also provided a wiper cam 134.

The devices for operating the cross-computing master wheel 46 also include a pinion 211 which is substantially identical with the pinion 122, except that it has no pinion like the pinion 99 fast thereto, but is geared to the above-described pinion 99, in a manner hereinafter described. The pinion 211 coöperates with a locking dog 212, which is substantially like the locking dog 116, being pivoted at 213 and forming part of a bell-crank system which includes two followers 214 and 215, said followers coöperating with a rocking cam 216, said cam having a projection 217 for making the overthrow dog 212 positively ineffective and a projection 218 for making it effective.

In order to operate the cam 216, it is fast to a rock shaft 219 which also carries a rock-arm 220, said rock-arm 220 being pivotally joined by a link 221 to a rock-arm 222 fast on the shaft 114ª, which shaft, it will be remembered, has fast to it the cam 119 which operates the locking dog 116. Thus, it will be seen that the two locking dogs 116 and 212 always operate in unison. In the same way the two wiper cams 134 are operated in unison, because the shaft 219 carries a rock-arm 223 which is joined by a link 224 to a rock-arm 225 fast to the shaft 226, on which the cross-computing wiper cam 134 is fast.

The stop wheel or pinion 122 of the main master wheel mechanism not only serves to prevent overthrow, but also serves as the driving wheel for driving the master wheel through an intermediate idle wheel 227 (Fig. 4) having a wheel 228 fast thereto, said second-named wheel 228 directly engaging a pinion 229 fast on the master-wheel shaft. The first-named idle wheel 227 meshes with the pinion 122, and is therefore adapted to drive the pinion 229 in the same direction as itself. To reverse the master wheel the pinion 122 is shifted laterally to selectively turn wheel 229, as set forth more in detail in my prior application, herein referred to. The pinion 99 shifts with the pinion 122, but is so wide, that in either of its positions it engages the rack bar 98 whenever that is effective.

In order to effect the shifting of the pinion 122 it is fast on the shaft 230, which extends out toward the right-hand end of the machine, where it is slidably journaled in a boss 231. It is at this point provided with connections which enable its pinion to be slid to addition or subtraction position by means of the addition-subtraction key lever 232 at the left-hand side of the machine, said lever being journaled on a stub shaft 233 and having a lever 234 attached thereto, which is pivotally joined by a link 235 to a vertical rock arm 236 which is fast on a horizontal shaft 237, said shaft carrying a second rock arm 237ª connected by a link 238, to operate a reversing lever 239 (Figs. 17 and 18).

The connections between the reversing lever 239 and the shaft 230 include a pair of cam slides 240 and 241, which are adapted to slide on opposite faces of the boss 231 and always slide in opposite directions because they are connected by a cross lever 242 pivoted intermediate its ends at 243, and having bosses 244 and 245 to engage the two cam slides 240 and 241, respectively, which have downwardly-projecting ears 246 forming pockets 247 to embrace the ends of the lever 242. Each of the cams 240 and 241 is adapted to shift the shaft 230, and for this purpose is provided with an arcuate cam face 248, which is adapted to bear against the toothed beveled face of its own gear of the pair of beveled gears 249 and 250, which are fast on the shaft 230. The connections are such that when the lever 239 is shifted to one side it will thrust the cam 240 forward, thus shifting the shaft 230 to the right, whereas, when shifting to the other side, it will thrust the cam 241 forward, withdrawing the cam 240, thus shifting the shaft 230 to the left. Such shifting of the shaft moves the pinion 122 from engagement with one of wheels 227 and 229 into engagement with the other, and thereby effects a reversing of the mechanism. Either slide 240 or 241 may act to lock the shaft 230 against accidental endwise movement, by the side of the effective slide overlapping the gear with which it coöperates.

In order to hold the cam slides 240 and 241 upon the boss 231, each is provided with a slot 251 by which it rides upon its own headed pin or screw 252. A plate 231ª (Fig. 4) secured on the top of the boss 231, overlaps the slides 240 and 241 to guide them in their movement. The rear end of the lever 239 rides in a notch 253 in the end of the link 238, and said link is supported by a headed pin 254 which fits in a slot 255 in the link.

In order to hold the add-subtract key 232 and the slides 240 and 241 controlled thereby in whichever position they are set, there is provided a pointed detent 256 (Fig. 4), which is effective on a pin 257 projecting from a rock arm 258 extending horizontally from the shaft 237. The detent 256 is pivoted at 259 and is under tension of a spring 260 which forces it against the pin 257, thus holding said pin against shifting past the center, while the limits of a slot 257ª prevent overthrow of the pin 257, and, consequently, of the add-subtract lever 232 also.

The cross-adding master wheel 46 is adapted to be geared to the footing or main master wheel 24 by a vertical shaft 261, which has slidably splined to its upper end a head 262 having a bevel gear 263 which is adapted to mesh with one or the other of the beveled gears 249 or 250, according to the position of the cam slides 240 and 241. For shifting the splined head 262 of the shaft 261, there is provided an off-on key 264, which is pivoted at 265 and has fast thereto a vertical extension 266 connected to shift the splined head 262. For shifting the head, there is provided a swinging stirrup 267 pivoted at 268 on a bracket 269 projecting from a plate on the frame of the typewriter, and this stirrup is provided with a slot 270 embracing a pin 271 fast on the arm 266, so that swinging the off-on key will swing the stirrup 267 and thereby cause either cam 272 or 273 thereon to be effective to shift the splined head 262 vertically.

To enable this to be done, the shaft 261 is extended into the boss 231 at 274 (Fig. 14), in order to steady it, and the head is provided with a double circular cam plate 275 which is adapted to be forced positively downward by the inclined edge of the cam 272 when it is moved to effective position, and is adapted to be forced upwardly by the inclined face of the cam 273 when that is moved to effective position against the head. The splining of the head is effected by having a slotted collar 276 fast on the shaft, into the slot of which projects a heel 277 of the shiftable head 262, the head being provided with a ledge 278 on each side of the heel 277, to prevent the head from sliding below the point at which it can be shifted by the cam 273. Each of the cams 272 and 273 is provided with an inclined annular face 279 to enable it to engage the double cam 275 as smoothly as possible. The cams 272 and 273 in their effective positions engage flat faces 272$^a$ and 273$^a$, respectively, of the member or plate 275 to act as a dwell surface or resistance to any force tending to cause an accidental displacement of the member 275.

In order to enable the cross-adding master wheel 46 to be independently set so that the kind of computation performed thereby may be identical or the reverse of that of the master wheel 24, the gear 211 therefor is shiftable like the gear 122, and is fast on a transverse horizontally slidable shaft 280, said shaft being provided with a beveled gear 281 which is splined thereon by a key 282, and constantly meshes with a beveled pinion 283 on the bottom of the shaft 261, being held in position by a bracket 283$^a$ on which the shaft is journaled. The shaft 280 is adapted to be shifted for addition or subtraction by means of a key 284, with the abbreviations "Iden." and "Rev." thereon, which is pivoted at 285 and has fast thereto a vertical lever 286 carrying a pin 287 which rides between two collars 288 fast on said shaft.

The add-subtract key 232 acts as an indicator for the kind of computation to be performed by the master wheel 24, as for example, if the "add" side of the key is in its depressed position, addition may be performed by the master wheel 24, whereas if the "sub" side of the key is in its actuated position, subtraction may be performed. To determine what kind of computation the master wheel 46 is performing, the key 284 is viewed in comparison with the key 232. If the "Iden." side of the key is in its depressed position, identical computation to that indicated by the key 232 may be performed on the master wheels 24 and 46. If, however, the "Rev." side of the key is in its depressed position, a reverse computation may be performed by the master wheel 46.

The machine may include a bichrome mechanism comprising the usual Underwood bichrome actuator which includes two pins 289 and 290 adapted to give the usual ribbon vibrator 291 a selective throw, thus enabling either the upper stripe 292 or the lower stripe 293 of the ribbon to be effective in printing.

To shift the actuator, the shaft 237 is utilized precisely as is the usual bichrome shaft of the Underwood typewriting machine, which, for this purpose, has mounted thereon (Fig. 1) a rock arm 294 which is adapted to shift the actuator. Thus, the actuator and, therefore, the color of printing is controlled by the add-subtract key 232, while the add-subtract key 284 of the cross-adding mechanism, is without effect on the color of printing.

The master wheel 24 is adapted to be made ineffective, i. e., silenced, without affecting either the add-subtract key 232 or the cross totalizing master wheel 46. To effect this the pinion 229 and the pinion 227 are adapted to be slid together out of range of the pinion 122 so that the latter will be ineffective in either of its positions, connection between the wheels or pinions 227 and 228 and pinion 229 being made by a flange 227$^a$ integral with the pinions 227 and 228 and engaging in a groove formed by two collars 305 formed on the hub of the pinion 229.

To shift the pinions 227 and 229 to effect this, there is provided an off-on key 295, which is conveniently near the main master wheel 24, with the result that it is naturally associated mentally with said wheel. This off-on key is pivoted at 296 and has fast thereto a vertical lever 297, having a pin-and-slot connection 298 with a vertical lever 299, pivoted between its ends at 300 and provided with a pin 301 riding between collars 302 fast on a shipper 303, said shipper being adapted to shift the wheel 229 on its shaft 304 to slide into and out of mesh with both the wheels 227, 228. To effect this, the hub of the wheel 229 is provided with the above mentioned collars 305 between which the turned-up end 306 of the shipper 303 rides (Figs. 4 and 20). In order to keep the wheel 229 from turning on its shaft 304, its hub is provided with a slot 307 which engages ears 308 on the shaft 304, said ears being of such length that the wheel 229 can never be disengaged therefrom.

The rack bars 32 and 42 have been described as mounted on the typewriter carriage. As will be seen from the rear view in Fig. 5, they are carried on the carriage by means of brackets 309, on which they are adjustably mounted by means of thumb-screws 310 and lock nuts 311, and are also provided with screws 312 extending through slots 313 (Fig. 5) in one of the brackets 309, thus permitting the rack bars to be held in place after being adjusted by the thumb-screws 310 and lock nuts 311. The rack bars are provided with extensions 314 by which they engage the brackets 309, and are cut away at 315 to allow adequate freedom of adjustment.

In order to facilitate the adjustment of other parts after the rack bars have been adjusted on the typewriter carriage, with reference to the working of the escapement, the plate 316, of which the cam 164 forms a part, is adjustably mounted on a plate 317 secured to the tabulating framework 57 by means of screws 318, which extend through slots 319 in the plate 316. The cam 183 is also separately adjustable being formed for this purpose as part of the plate 184, provided with slots 321 through which pass screws 322, by which it may be held in place after being properly adjusted.

In order to provide for the possible overthrow of the cross-computing carriage, when the bar 163 is being released by means of the pin 162, the plate 184 includes a cut-away portion 323 beyond the cam 183, to allow for some idle travel of the pin 162. In order to increase the depth to which the blade 41 is seated in the notch 161, the pivoted bar 163 is provided with a raised portion 324, on which the follower 170 is effective during the major part of the travel of the cross-adding carriage, there being a depression 325 and 326 at each end of the raised portion 324, to minimize the amount of throw of the pivoted bar 163 needed in the usual operations of connecting and disconnecting. The roller 170 on the lever 168 acts as a flexible support on which one end of the bar 163 rides.

The computing mechanism may be disconnected from the typewriting mechanism at any time, by shifting forwardly a disconnect handle 327, said handle being pivoted at 328, so that when pulled forwardly it thrusts rearwardly a link 329, with the result that said link causes a bell crank 330 to depress its upper arm 331 against the stirrup 91, thereby swinging the stirrup 91 clear of the pin 93, with the result that although the bail 83 continues to rock with the depression of the numeral keys, it rocks absolutely idly. The bell crank 330 is also adapted to disconnect the computing mechanism automatically, whenever the typewriting mechanism is effective to write in upper case. For this purpose, the usual platen shift key 332 is effective in the usual manner to shift the bell cranks 333 upwardly, thus lifting the rail 334 on which the platen shift frame is supported, with the result that the platen 8 is in upper-case position. The shifting of the bell cranks 333 causes a pin 335 on the lower arm of one of them to thrust forwardly a link 336, pivoted to the upper end of the bell crank 330, with the result that the depression of the platen shift key carries the stirrup 91 clear of the pin 93. In order that the handle 327 may remain undisturbed when swinging the bell crank 330 by the shift key, it is connected to the link 329 by means of a pin-and-slot connection 337, and for the purpose of permitting the shift key 332 to remain undisturbed when actuating the disconnect key 327, the link 336 is provided with a slot 338.

In order to reset the stops 31 and the blades 41 to their ineffective position, each stop and each blade comprises a tail 339 which projects outside of the rack bar on which the stop and blade are mounted, so that the turned-over edge 340 of a slide 341 on the rack bar may be slid outwardly, with the result that it will withdraw all the stops or blades on that rack bar to their normal position. In order to effect this simply, each slide 341 is provided with diagonal slots 342, through which pass headed screws 343, with the result that the slots 342 form cams adapted to throw the edges 340 outward, so that mere pulling of either of the slides 341 endwise will reset the stops or the blades on which it is effective, it being noted that one slide 341 is effective on all the blades, while the other slide 341 is effective on all the stops, so that either the stops or the blades may be independently returned to ineffective position. For operating the slides 341, each slide is continued beyond its rack bar, and for the purpose of forming a handle its end is turned over, as seen at 344, (Fig. 5).

Variations may be resorted to within the scope of the invention, and portions of the improvements may be used without others.

Having thus described my invention, I claim:

1. The combination with a traveling typewriter carriage, of a series of tabulating stops for positioning said carriage, a cross-adding device, a series of stops for positioning said cross-adding device, and key-operated means for setting both sets of stops.

2. The combination with a traveling typewriter carriage, of a series of tabulating stops for positioning said carriage, a cross-adding device, a series of stops for positioning said cross-adding device, key-operated means for setting both sets of stops, and separately-operable means for unsetting all the set stops of either kind.

3. The combination with a traveling typewriter carriage, of a series of tabulating stops for positioning said carriage, a cross-adding device, a series of stops for positioning said cross-adding device, and key-operated means for selectively setting both sets of stops.

4. The combination with a traveling typewriter carriage, of a series of tabulating stops for positioning said carriage, a cross-adding device, a series of stops for positioning said cross-adding device, key-operated means for selectively setting both sets of stops, and separately-operable means for unsetting all the set stops of either kind.

5. The combination with a traveling typewriter carriage, of a series of tabulating stops for positioning said carriage, a cross-adding device comprising a traveling carriage, a series of stops for positioning said cross-adding device, and key-operated means for selectively setting both sets of stops.

6. The combination with a traveling typewriter carriage, of a series of tabulating stops for positioning said carriage, a cross-adding device, a series of stops for positioning said cross-adding device, mechanism for setting both sets of stops, a single key for said mechanism, and a finger-piece effective on said mechanism and settable to determine whether a stop shall be set in one or both series.

7. The combination with a series of settable stops, of a key-operated arm for selectively setting said stops, a second series of settable stops, a second normally ineffective arm for setting stops in said second series, and an interponent adapted to be made effective to cause said first arm to operate said second arm.

8. The combination with a series of settable stops, of a key-operated arm for selectively setting said stops, a second series of settable stops, a second normally ineffective arm for setting stops in said second series, an interponent adapted to be made effective to cause said first arm to operate said second arm, and means for independently unsetting the set stops of either set.

9. The combination with a carriage, of a rack bar, a series of slidable stops mounted thereon, an arm overlying said rack bar, a key for moving said arm to selectively move single stops to set them, a second rack bar, a series of slidable stops mounted thereon, a second arm overlying said second rack bar, an extension of said first arm normally moving idly therewith, an interponent, and means for setting said interponent into the path of said extension to cause it to operate said second arm.

10. The combination with a carriage, of a rack bar, a series of slidable stops mounted thereon, an arm overlying said rack bar, a key for moving said arm to selectively move single stops to set them, a second rack bar, a series of slidable stops mounted thereon, a second arm overlying said second rack bar, an extension of said first arm normally moving idly therewith, an interponent, means for setting said interponent into the path of said extension to cause it to operate said second arm, a tail on each stop, a plate on each rack bar adapted to engage the tails of its own stops, and a finger-piece for each plate adapted to cause it to move its stops to ineffective position.

11. The combination with a carriage, of a rack bar, a series of slidable stops mounted thereon, an arm overlying said rack bar, a key for moving said arm to selectively move single stops to set them, a second rack bar, a series of slidable stops mounted thereon, a second arm overlying said second rack bar, an extension of said first arm normally moving idly therewith, an interponent, means for setting said interponent into the path of said extension to cause it to operate said second arm, an escapement for said carriage, and means for separately adjusting said rack bars to conform to the escapement feeding of the carriage.

12. The combination with an array of settable stops, of a second array of settable stops, a bar for selectively setting said first array, means including a separate bar for separately setting said second array, a link pivoted on said second bar, mechanism comprising a finger-piece for shifting said link to effective or ineffective position, and a connection from said first bar adapted to be effective or ineffective on said link, according to the position of the link.

13. The combination with an array of settable stops movable vertically, of a second array of settable stops movable horizontally, an arm for selectively setting the stops of said first array, a second arm for selectively setting the stops of the second array, mechanism including a key adapted to move said first arm vertically, an extension on said first arm, a slide bar adapted to be moved vertically by said first arm, a link pivoted to said slide adapted to determine whether it shall be so moved, and a cam connection between said slide and said second arm for moving said second arm horizontally to cause it to set a stop.

14. The combination with an array of settable stops movable vertically, of a second array of settable stops movable horizontally, an arm for selectively setting the stops of said first array, a second arm for selectively setting the stops of the second array, mechanism including a key adapted to move said first arm vertically, an extension on said first arm, a slide bar adapted to be moved vertically by said first arm, a link pivoted to said slide adapted to determine whether it shall be so moved, a cam connection between said slide and said second arm for moving said second arm horizontally to cause it to set a stop, and means including a settable finger-piece adapted to control the position of said slide.

15. In a combined typewriting and computing machine, in combination, a traveling carriage, settable column-stops at letter-space intervals on said carriage, settable computation-controlling stops at letter-space intervals on said carriage, a key, and means actuated by said key for setting either a column-stop or a column-stop and a computation-controlling stop concomitantly.

16. In a computing machine, the combination with a traveling typewriter carriage, of a separate computing carriage, blades settable on said typewriter carriage to cause said computing carriage to move therewith, a hook for engaging said blades, so that the two carriages positively move together forwardly and backwardly when said hook engages any blade, a slide on which said hook is mounted, a segment gear meshing with said slide, a second segment adjustably fast to said first segment, and gearing whereby said second segment is positively geared to said computing carriage.

17. In a computing machine, the combination with a traveling typewriter carriage including a totalizer, of a separate computing carriage including a totalizer, a separate master wheel for each totalizer, means for gearing said master wheels together, carry-over devices for each of said totalizers, each including an alining device adapted to take up lost motion in the carry-over devices for each of said totalizers, and connections whereby one of said alining devices is caused to positively operate the other.

18. In a computing machine including typewriter and numeral keys, the combination with a traveling typewriter carriage and an escapement device therefor, adapted to feed the carriage on the up-stroke of the typewriter keys, of computing mechanism adapted to compute on the down-stroke of the keys, a totalizer forming part of said typewriter carriage making up part of said computing mechanism, a separate totalizer also forming part of said computing mechanism, carry-over devices for each totalizer, including separate means for each totalizer for taking up lost motion, connections whereby said taking-up means are positively operated together, and a link operated by the movement of the typewriter escapement on the down-stroke of a key, for making said means effective to take up lost motion.

19. In a combined typewriting and computing machine, the combination with a traveling carriage and a footing totalizer, of an array of carry-over devices for said totalizer, a cross-adding totalizer, an array of carry-over devices for said cross-adding totalizer, each array of carry-over devices including means for driving each device of its array to complete the carry-over, and a vibrating link joining the two means for causing them to operate in unison.

20. In a combined typewriting and computing machine, the combination with a traveling carriage and a footing totalizer, of a set of carry-over devices for said totalizer means for driving said set to complete the carry-over, a cross-adding totalizer, a set of carry-over devices for said cross-totalizer including means for driving its set of devices to complete the carry-over, a link joining the two means for causing them to operate in unison, an escapement for said carriage, and a connection from said escapement for operating said link.

21. In a combined typewriting and computing machine, the combination with a traveling carriage and a footing totalizer, of a cross totalizer, a separate set of carry-over devices for each totalizer, each set including a set of detents, a member universal to one set of carry-over devices for making its detents effective, a separate member universal to the other set of carry-over devices for making its detents effective, and means for causing said two members to operate in unison.

22. In a combined typewriting and computing machine, the combination with a traveling carriage and a footing totalizer, of a cross totalizer, a separate set of carry-over devices for each totalizer, each set including a set of detents, a member universal to one set of carry-over devices for making its detents effective, a separate member universal to the other set of carry-over devices for making its detents effective, means for causing said two members to operate in unison, an escapement for said typewriter carriage, and a connection from said escapement to one of said members for operating it.

23. In a computing machine, the combination with a totalizer and printing devices, of computing wheels forming part of said totalizer, a shaft for driving said computing wheels, numeral keys, a second shaft under the control of said numeral keys, beveled gears on said first shaft, a beveled gear on said second shaft, means for shifting the first-named shaft with its beveled gears to cause them to selectively engage the beveled gear of the second shaft to cause addition or subtraction, a spline connecting the second shaft to its beveled gear, and means for shifting said beveled gear on its shaft, so that it may engage with or be disengaged from the gears on the first-named shaft.

24. In a computing machine, the combination with a totalizer and printing devices, of computing wheels forming part of said totalizer, a shaft for driving said computing wheels, numeral keys, a second shaft under the control of said numeral keys, beveled gears on said first shaft, a beveled gear on said second shaft, means for shifting the first-named shaft with its beveled gears to cause them to selectively engage the beveled gear of the second shaft to cause addition or subtraction, a spline connecting the second shaft to its beveled gear, a cam shifting with said splined beveled gear, and a swinging stirrup comprising cams adapted to be selectively swung into engagement with the first-named cam to shift its gear to effective or ineffective position.

25. In a computing machine, the combination with a totalizer and printing devices, of computing wheels forming part of said totalizer, a shaft for driving said computing wheels, numeral keys, a second shaft under the control of said numeral keys, beveled gears on said first shaft, a beveled gear on said second shaft, means for shifting the first-named shaft with its beveled gears to cause them to selectively engage the beveled gear of the second shaft to cause addition or subtraction, a spline connecting the second shaft to its beveled gear, a cam fast to said splined beveled gear, and key-operated cams adapted to engage said first-named cam to cause it to shift its gear to effective or ineffective position.

26. In a computing machine, the combination with a totalizer and computing wheels therefor, of a shaft for driving said wheels, a pair of beveled gears fast on said shaft for selectively driving it, a second shaft, a beveled gear turning the said second shaft, a slidable journal for said first-named shaft, and a pair of cams slidable along said journal and adapted to engage the beveled faces of its beveled gears to shift said shaft to selectively effect addition or subtraction.

27. In a computing machine, the combination with a totalizer and computing wheels therefor, of a shaft for driving said wheels, a pair of beveled gears on said shaft for selectively driving it, a second shaft, a beveled gear turning with said second shaft, a slidable journal for said first-named shaft, a pair of cams slidable along said journal and adapted to engage the beveled faces of its beveled gears to shift said shaft to selectively effect addition or subtraction, a single lever for shifting said slidable cams, an extension on said lever, and mechanism including a finger-piece for operating said lever by said extension.

28. In a computing machine, comprising two totalizers, each having computing wheels, the combination of a reversing gear for one totalizer including a shaft, a second shaft for operating the other totalizer, a beveled gear for operating said second shaft, and a pair of beveled gears fast to said first-named shaft adapted to be caused to selectively engage said second beveled gear by the shifting of said shaft when its pinion effects a reversing of the first totalizer.

29. In a computing machine, comprising two totalizers, each having computing wheels, the combination of a reversing gear for one totalizer, including a shaft, an axially-slidable pinion, a second shaft for operating the other totalizer, a beveled gear for operating said second shaft, a pair of beveled gears fast to said first-named shaft adapted to be caused to selectively engage said second beveled gear by the shifting of said shaft to cause its pinion to effect a reversing of the first totalizer, a pair of cams for selectively engaging the beveled surfaces of the pair of beveled gears, and mechanism including a finger-piece for making said cams selectively effective.

30. In a computing machine, the combination with two totalizers, each comprising computing wheels, of a master wheel for each totalizer, a pinion for each master wheel shiftable axially relatively thereto to effect reversal of its master wheel, a separate shaft for each pinion, each pinion being fast on its own shaft, a third shaft connecting said first two shafts, a beveled pinion on said third shaft, a pair of beveled pinions on one of said first shafts adapted to be effective in reverse direction on said third shaft beveled gear by shifting the pinion of the first shaft to effect reversing thereof, means whereby one of said shafts may be shifted axially with its pinion without effect on the reversing thereof, and mechanism including finger-pieces for selectively shifting said shafts.

31. In a combined typewriting and computing machine, the combination with numeral keys and a traveling typewriter carriage, of a cross-adding carriage, a hook adapted to link said typewriter carriage to said cross-adding carriage, a slide on which said hook is pivoted, a blade settable on said typewriter carriage for engaging said hook to unite the carriages, a spring-follower constantly holding said hook in the path of said blade, and a raised portion on said hook adapted to be engaged by said follower to further raise the hook to hold the hook in engagement with the blade during the period of travel of the cross-adding carriage.

32. In a combined typewriting and computing machine, the combination with numeral keys and a traveling typewriter carriage, of a cross-adding carriage, a hook adapted to link said typewriter carriage to said cross-adding carriage, a slide on which said hook is pivoted, a blade settable on said typewriter carriage for engaging said hook to unite the carriages, a spring-follower constantly holding said hook in the path of said blade, a raised portion on said hook adapted to be engaged by said follower to further raise the hook to hold the hook in engagement with the blade during the period of travel of the cross-adding carriage, and a stop for limiting the throw of said follower to control the relative position of the hook and the blade.

33. In a combined typewriting and computing machine, the combination with a traveling typewriter carriage, of a cross-adding carriage, a blade on said typewriter carriage, a hook adapted to engage said blade, a follower tending to raise said hook into the path of said blade, a spring constantly drawing on said follower, a stop limiting the throw thereof, and a cam-piece adapted to limit the throw of the hook relative to the blade.

34. In a combined typewriting and computing machine, the combination with a traveling typewriter carriage, of a cross-adding carriage, a blade on said typewriter carriage, a hook adapted to engage said blade, a follower tending to raise said hook into the path of said blade, a spring constantly drawing on said follower, a stop limiting the throw thereof, a cam-piece adapted to limit the throw of the hook relative to the blade, said cam-piece being adjustable, and an adjustable cam-piece for disconnecting the hook from the blade by travel of the typewriter carriage.

35. In a combined typewriting and computing machine, the combination with a master wheel, of a reciprocating rack bar for operating said master wheel, devices including numeral keys for variably reciprocating said bar, a typewriter carriage, an escapement for said carriage adapted to throw said rack bar to effective and ineffective position, a lock for said master wheel made effective by the moving of the rack bar to ineffective position, a second master wheel geared to said first master wheel, a lock for said second master wheel, and a link connecting said first lock to said second lock.

36. In a typewriting machine, the combination of normally unset members at letter-space positions apart but adapted to be individually set, and means for setting a plurality of said members to effective positions simultaneously.

37. In a typewriting machine, the combination of normally unset members at letter-space positions apart but adapted to be individually set, and means for setting one or more of said members by a single actuation of said setting means.

38. In a typewriting machine, the combination of normally unset members at letter-space positions apart but adapted to be set individually, and means for setting a plurality of said members differently by a single actuation of said setting means, and each set member adapted to perform a different function.

39. In a typewriting machine, the combination of members adapted to be set at letter-space positions, and means for setting a plurality of said members simultaneously, said means comprising a plurality of setting arms.

40. In a typewriting machine, the combination of members adapted to be set at letter-space positions, means for setting a plurality of said members simultaneously, said means comprising a plurality of setting arms, and means for determining how many setting arms should be effective.

41. In a typewriting machine, the combination of settable members adapted to be set at letter-space positions, setting means for said members, and means for determining whether the setting means should be effective on one or more settable members simultaneously.

42. The combination of a plurality of rack bars, settable members on each rack bar, means for setting said members, and means for determining whether the setting means should be effective on one or more settable members.

43. In a typewriting machine, the combination of a plurality of rack bars, settable members on said rack bars, a setting arm associated with each rack bar, and means for actuating said setting arms to selectively set said settable members on said rack bars.

44. In a combined typewriting and computing machine, the combination with a typewriter carriage and a separate computing carriage, of settable members for positioning said typewriter carriage, settable members adapted to form part of a mechanism to connect the computing carriage with the typewriter carriage at predetermined positions in the travel of said typewriter carriage, and means for setting all of the settable members arranged at the same corresponding letter-space position.

45. In a typewriting machine, the combination of a plurality of rack bars, settable members on said rack bars, a setting arm associated with each rack bar, means for actuating said setting arms to selectively set said settable members on said rack bars, and means for determining whether said setting means should be effective on one or more of said settable members.

46. In a combined typewriting and computing machine, the combination with a master wheel, of a reciprocating rack-bar for operating said master wheel, devices including numeral keys for variably reciprocating said bar, a typewriter carriage, an escapement for said carriage adapted to throw said rack-bar to ineffective position at the end of a stroke thereof, a lock for said master wheel made effective by the moving of the rack-bar to ineffective position, a second master wheel geared to said first master wheel, a lock for said second master wheel, and a link connecting said first lock to said second lock.

47. In a combined typewriting and computing machine, the combination with a master wheel, of a reciprocating rack-bar for operating said master wheel, devices including numeral keys for variably reciprocating said bar, a typewriter carriage, an escapement for said carriage adapted to throw said rack-bar to ineffective position at the end of a stroke thereof, a lock for said master wheel made effective by the moving of the rack-bar to ineffective position, a totalizer adapted to be operated by said master wheel, carry-over devices for said totalizer, an alining device for said carry-over devices operated by said escapement, a second totalizer, a second master wheel adapted to be geared to said first master wheel, a lock for said second master wheel, carry-over devices for said second totalizer, and alining device for said last-named carry-over devices, and means for causing the two locking devices and the two carry-over alining devices to operate in unison.

48. In a combined typewriting and computing machine, the combination with typewriter numeral keys and a traveling carriage, of a locking dog for said carriage, a locking bar moved by the depression of a numeral key, a follower on said bar, a cam adapted to operate said dog, said cam comprising a dwell in which said follower normally rests, a driving surface, and a dwell in which said follower rests during a substantial part of the key-stroke.

49. In a combined typewriting and computing machine, the combination with typewriter numeral keys and a traveling carriage, of a locking dog for said carriage, a locking bar moved by the depression of a numeral key, a follower on said bar, a cam adapted to operate said dog, said cam comprising a dwell in which said follower normally rests, a driving surface, a dwell in which said follower rests during a substantial part of the key-stroke, a second carriage, a locking dog for said second carriage, a follower for operating said locking dog and driven by the first locking dog mechanism, and a cam on which said second follower is effective for operating the dog comprising a dwell in which said second follower normally rests, a driving surface, and a second dwell in which the follower rests during a substantial part of the key-stroke.

50. In a combined typewriting and computing machine, the combination with typewriter numeral keys and a traveling carriage, of a variably driven computing member, a set of differential cams on said keys for driving said computing member, a second set of cams on said keys, a bail universal to said second set of cams and adapted to be made effective to lock every undepressed key by the depression of one key, a lock for said carriage, a cam-arm extending from said lock, and a follower-arm fast to said bail and effective on said cam-arm to operate the lock.

51. In a combined typewriting and computing machine, the combination with typewriter numeral keys and a traveling carriage, of a variably driven computing member, a set of differential cams on said keys for driving said computing member, a second set of cams on said keys, a bail universal to said second set of cams and adapted to be made effective to lock every undepressed key by the depression of one key, a lock for said carriage, a cam-arm extending from said lock, a follower-arm fast to said bail and effective on said cam-arm to operate the lock, a rotatable bar to which said lock is fast, an arm fast to said rotatable bar, a second carriage, a second lock for said second carriage, a follower on said last-named arm, and a cam fast to said second lock adapted to be operated by said second follower.

52. In a combined typewriting and computing machine, the combination with typewriter numeral keys and a traveling carriage, of a locking dog for said carriage, a locking bar moved by the depression of a numeral key, a follower on said bar, a cam adapted to operate said dog, said cam comprising a dwell in which said follower normally rests, a driving surface, and a dwell in which said follower rests during a substantial part of the key-stroke, a totalizer comprising computing wheels, means normally holding said wheels locked, and means connected to said dog for making said locking means ineffective.

53. In a combined typewriting and computing machine, the combination with typewriter numeral keys and a traveling carriage, of a variably driven computing member, a set of differential cams on said keys for variably driving said computing member, a master wheel, a second set of cams on said keys, a member universal to said second set of cams, means normally locking said master wheel, and a connection operated by said universal member for releasing said master wheel.

54. In a combined typewriting and computing machine, in combination, a traveling carriage, settable column-stops at letter-space intervals on said carriage, settable computation-controlling stops at letter-space intervals on said carriage, a key, stop-setting means actuated by said key, and means to determine whether a column-stop only or a column-stop and a computation-controlling stop are to be set by said stop-setting means.

55. In a combined typewriting and computing machine, in combination, a traveling carriage, settable column-stops at letter-space intervals on said carriage, settable computation-controlling stops at letter-space intervals on said carriage, a key, means actuated by said key for setting either a column-stop or a column-stop and a computation-controlling stop concomitantly, and tabulating means to coöperate with set column-stops to effect positioning of the carriage so that said setting means may be utilized to set computation-controlling stops in positions corresponding to those of column-stops already set.

56. In a typewriting machine, the combination with a traveling carriage, of tabulating means, including a set of column-tops, for arresting said carriage, a separate set of stops, one for each letter-space position in the travel of the carriage, means including a stop-setting key for setting stops of said separate set in positions corresponding to the position of the carriage determined by said column-stops, and normally ineffective mechanism for modifying the action of the machine, rendered effective by the set stops of said separate set.

57. In a typewriting machine, in combination, a traveling carriage, a plurality of sets of settable stops comprising stops for all letter-space positions of the carriage travel, one of said sets comprising column-stops, keys, and means whereby successive actuation of certain of said keys will position the carriage in accordance with the position of a set column-stop, and set a stop of another of said sets in a position corresponding to that of the set column-stop.

58. The combination with a traveling carriage and back bars therefor, of stops settable on one of said rack bars at letter-space intervals or multiples thereof, a set of settable stops positioned at letter-space intervals on another of said rack bars, tabulating means to coöperate with said first-mentioned stops to position the carriage, a key, and means actuated by said key for positioning certain of said second-mentioned stops in accordance with the positions of said carriage determined by the setting of said first-mentioned stops.

59. In a combined typewriting and computing machine, in combination, a traveling carriage, a set of settable column-stops at letter-space intervals on said carriage, a second set of settable stops at letter-space intervals on said carriage, computing mechanism controlled by set stops of said second set, a setting key, setting-key-actuated means for setting stops in positions corresponding to the positions of the carriage, means for controlling said setting means to determine the setting of a column-stop only, or of a column-stop and a stop of said second set, and tabulating means to coöperate with set column-stops to position the carriage to enable setting by said key of stops of said second set in case the latter were not set concomitantly with the corresponding column-stops.

60. In a computing machine, in combination, a totalizer, a master wheel, numeral keys, numeral-key-controlled means to actuate said master wheel in accordance with the numeral key depressed, numeral-key-controlled means to feed said totalizer past said master wheel step by step, a lock to prevent movement of said totalizer while computation is being effected, and means actuable by any of said numeral keys for rendering said lock effective, said last-mentioned means comprising a pivoted arm adapted to be rocked at each actuation of a numeral key, a follower on said arm, and a cam connected with said lock and positioned to be actuated by said follower, said cam having a lift portion, whereby actuation thereof is effected, and a dwell portion concentric with the pivot of said arm, when in locking position, to effect a locking of said cam against return movement and thereby prevent release of said totalizer lock.

61. In a computing machine, in combination, a traveling totalizer, numeral keys, numeral-key-actuated means to actuate said totalizer, and means to lock said totalizer while computation is being effected, including a rack connected with said totalizer to travel therewith, a dog to coöperate with said rack, a shaft on which said dog is fixed, a cam-arm fixed on said shaft, comprising an active portion and a dwell portion, a follower to coöperate with said cam-arm, an arm on which said follower is mounted, a shaft on which said arm is mounted, and numeral-key-actuated means to swing said arm to move said follower along said active portion and said dwell portion, to successively move said dog into locking position and lock the same in such position.

62. In a computing machine, in combination, a traveling totalizer, a rack connected with said totalizer to travel therewith, a pivotally-mounted dog to engage said rack, a cam-arm connected to the dog to swing therewith, said cam-arm having an active portion and a dwell portion, a follower to engage said cam-arm, an arm on which said follower is mounted, and a pivotal support for said arm, whereby actuation of said arm will cause said dog to be moved into effective position and thereafter locked, the back pressure of said totalizer being taken up by the pivotal support of said arm.

63. In a computing machine, in combination, a traveling totalizer, a rack connected with said totalizer to travel therewith, a pivotally-mounted dog to engage said rack, a cam-arm connected to the dog to swing therewith, said cam-arm having an active portion and a dwell portion, a follower to engage said cam-arm, a movable member on which said follower is mounted, and supporting means for said movable member determining the path of movement thereof, whereby actuation of said movable member will cause said dog to be moved into effective position and thereafter locked, the back pressure of said totalizer on said dog being taken by said supporting means.

64. In a computing machine, in combination, a traveling totalizer, a rack connected with said totalizer to travel therewith, a dog to engage said rack, a cam-arm connected with said dog to move therewith, said cam-arm comprising opposed cams spaced at substantially the same distance apart throughout their lengths, said cams having opposed active portions, whereby the cam-arm may be swung in a direction to render said dog effective, or in the opposite direction, and opposed dwell portions substantially in the form of arcs of circles, a follower projecting between said cams to actuate the same, an arm on which said follower is supported, and a pivotal support for said arm, positioned so that when the follower is in engagement with said dwell portions, the latter will be substantially concentric with said pivotal support.

65. In a computing machine, in combination, a traveling totalizer, a rack connected with said totalizer to travel therewith, a dog to engage said rack, a cam-arm connected with said dog to move therewith, said cam-arm comprising opposed cams spaced at substantially the same distance apart throughout their lengths, said cams having opposed active portions, whereby the cam-arm may be swung in a direction to render said dog effective, or in the opposite direction, and opposed dwell portions substantially in the form of arcs of circles, a follower projecting between said cams to actuate the same, an arm on which said follower is supported, a pivotal support for said arm, positioned so that when the follower is in engagement with said dwell portions, the latter will be concentric with said pivotal support, numeral keys, and means, actuated by each of said numeral keys, to move said arm and thereby effect locking of said totalizer against traveling movement.

66. In a computing machine, in combination, a traveling totalizer, a rack connected with said totalizer to travel therewith, a dog to engage said rack, a cam-arm connected with said dog to move therewith, said cam-arm comprising opposed cams spaced at substantially the same distance apart throughout their lengths, said cams having opposed active portions, whereby the cam-arm may be swung in a direction to render said dog effective, or in the opposite direction, and opposed dwell portions substantially in the form of arcs of circles, a follower projecting between said cams to actuate the same, an arm on which said follower is supported, a pivotal support for said arm, positioned so that when the follower is in engagement with said dwell portions, the latter will be concentric with said pivotal support, a bail connected to said arm to swing therewith, numeral-key-levers, and cams on said numeral-key-levers, whereby actuation of any of said numeral-key-levers will cause actuation of the bail to a position to effect locking of said totalizer against traveling movement.

67. In a computing machine, in combination, a traveling totalizer, a rack connected with said totalizer to move therewith, a dog movable into engagement with said rack to lock the totalizer against traveling movement, a pivoted arm, means whereby movement of said pivoted arm to effective position will shift said dog to effective position and lock the same in such position, numeral keys, and means actuated by said numeral keys to move said pivoted arm into effective position and lock the same in such effective position.

HENRY L. PITMAN.

Witnesses:
EDITH B. LIBBEY,
JENNIE P. THORNE.